United States Patent Office 3,232,738
Patented Feb. 1, 1966

3,232,738
FERTILIZER AND PROCESS FOR MAKING
FROM WASTE PICKLING LIQUOR
Richard B. Bahme, 3 Fleetwood Court, Orinda, Calif.
No Drawing. Filed Jan. 10, 1964, Ser. No. 336,875
14 Claims. (Cl. 71—25)

This application is a continuation-in-part of application Serial No. 174,689, filed February 21, 1962.

This invention relates to new processes for making fertilizers from waste pickling liquors of the steel and galvanizing industries and to the resultant fertilizer products. In some forms, it also utilizes waste ore tailings from mining operations, waste pyrites fines as used in the manufacture of sulfuric acid from pyrites ores, or waste ash and wood slag from the burning of wood scraps, sawdust, and the like.

There is an ever-present desire in the fertilizer industry to lower manufacturing costs, and large sums are spent each year in attempts to find cheaper raw materials and more economical processes. I have found that the spent pickling liquor from the steel and galvanizing industries can be treated so as to convert them into inexpensive and nutritious fertilizers.

Also, other waste products such as the ore tailings from mining operations and the ash and slag-like matter that accumulate in the large incinerators used in the lumber and associated industries to burn up wood scraps and the like may be used.

My invention provides processes for converting the waste pickling liquors from the steel and galvanizing industries into ammine compounds and other ammonia complexes, which are highly suitable for use as fertilizers.

Another object of my invention is to provide processes for utilizing waste mine ore tailings and for utilizing waste ash and slag from the lumber milling industry.

Another object of my invention is to provide new liquid fertilizer compositions containing nitrogen and other essential plant growth elements in a form which is readily available to the plant.

A further object of my invention is to manufacture fertilizers by inexpensive methods.

Another object of my invention is to provide a method for increasing the concentration of ammonia in ammoniacal solutions without increasing the vapor pressure of ammonia therein.

My invention results in formation of ammine (i.e. the diammine, triammine, tetraammine, hexammine, and other ammonia complex) compounds of iron, zinc, and other metals. These ammine compounds are solids at standard temperature and pressure, and are soluble in water. Substantially all concentrations of these compounds in water may be made, and water solutions thereof may be evaporated to dryness to get the solid compound.

These metallic ammine compounds are made by reacting anhydrous or aqueous ammonia with waste pickling liquors. Typical reactions that occur when sulfates of thes liquors are reacted with anhydrous ammonia are as follows:

(1)   $FeSO_4 + 4NH_4OH \rightarrow Fe(NH_3)_4SO_4 \cdot 4H_2O$
(2)   $ZnSO_4 + 4NH_4OH \rightarrow Zn(NH_3)_4SO_4 \cdot 2H_2O + 2H_2O$
(3)   $2FeSO_4 + 2NH_4OH \rightarrow (NH_4)_2Fe(SO_4)_2 + Fe(OH)_2$ The ammines dissociate in the following manner:

(4)   $Fe(NH_3)_4SO_4 \rightarrow Fe(NH_3)_4^{++} + SO_4^{--}$
(5)   $Zn(NH_3)_4SO_4 \rightarrow Zn(NH_3)_4^{++} + SO_4^{--}$
(6)   $(NH_4)_2Fe(SO_4)_2 \rightarrow NH_4^+ + NH_4Fe(SO_4)_2^-$ These compounds make outstanding fertilizers. For example:

(1) $Fe(NH_3)_4SO_4$ contains about 25% nitrogen, 25% iron and 15% sulfur;

(2) $Cu(NH_3)_4SO_4$ contains about 25% nitrogen, 28% copper, and 14% sulfur;

(3) $Zn(NH_3)_4SO_4$ contains about 25% nitrogen, 29% zinc, and 14% sulfur;

(4) $(NH_4)_2Fe(SO_4)_2$ contains about 10% nitrogen, 20% iron, and 22% sulfur.

The water solubility of these metallic ammine sulfates makes them ideally suited for use as liquid fertilizers. Simple aqueous solutions of these compounds contain plant nutrients in a form readily available to plant life. Where desirable, additional fertilizer components may be combined with these metallic ammine sulfates to provide a "fortified" product. For instance, ammonia, urea, ammonium nitrate, ammonium sulfate, and other similar ammonia compounds, singly or in combination, may be dissolved in the water solutions of the sulfates to increase the nitrogen content. Of course, other suitable compositions and compounds, such as phosphoric acid and/or potassium salts, also may be added to these solutions.

Waste pickling liquor from the steel and galvanizing industry includes dilute sulfuric acid and metal sulfates. The metallic sulfates can be precipitated by concentration, and then reacted with ammonia to form the particular metallic ammine and ammonium sulfates, which are valuable soil conditioners and fertilizers. This pickling acid treatment also can be used with tailings and fines which have not been previously leached with ammonia or ammonium sulfide. Thus, by my invention hitherto waste materials, i.e. mine ore tailings, pyrites fines from sulfuric acid manufacturing, and the pickling liquor from the steel and galvanizing industry are transformed into valuable raw materials for manufacturing fertilizers in a less expensive manner.

Another plentiful supply of inexpensive raw material for manufacturing fertilizers according to my invention is the ash resulting from burning waste wood scraps, sawdust, and other organic matter in the lumber milling industry. At practically every lumber mill and plywood plant, and at many other wood product manufacturing establishments, much waste wood scraps, chips, sawdust, bark, leaves, etc. are produced, and they are burned as the easiest method of disposal. The ash resulting from this burning is very alkaline, usually around pH 11.5 or higher, but, depending upon what type of plant matter has been burned, it contains substantially every element except nitrogen and sulfur, essential to plant life including potassium, copper, phosphorus, manganese, magnesium, aluminum, calcium, iron, and zinc, mostly as basic oxides and/or carbonates.

I have found that if this waste ash, which sometimes occurs as a slag-like material, is neutralized with the waste pickling liquor from the steel and galvanizing industries, the resulting liquid contains many metallic sulfates and other essential compounds and elements in a form easily and readily assimilated by plants. This liquid can be applied directly to the soil without further modification, or other fertilizer components, such as ammonia and other nitrogen-containing compounds, can be added to it, thus providing nitrogen and increased amounts of other elements. Alternatively, the pickling liquor can be modified by adding to it various compounds especially nitric and/or phosphoric acids, before combining it with the ash. Also, the pickling liquor can be neutralized partly by ash and partly by ammonia, either separately or by combining the ash and ammonia before reacting with the liquor.

When waste pickling liquors are reacted with anhydrous ammonia or ammonia solutions, the vapor pressure of the ammonia drops, but the amount of ammonia remains substantially the same. By adjusting the ratio of the ammonia and the metal salt reactants, the vapor pressure of the ammonia can be lowered to any desired figure, even down to zero, so that the vapor pressure of the solution is that of pure water. This phenomenon has particular importance in the fertilizing industry where the concentration of nitrogen (as ammonia) in solution has been limited to around 20% by the practical considerations of the increasing rate of vaporization of ammonia at higher concentrations, and by the added cost of heavier and stronger containers and equipment needed to handle these higher vapor pressure solutions. I have found that the high vapor pressure of 40–50% ammonia solutions can be lowered sufficiently to permit their use as liquid fertilizers if they are first reacted with metal sulfates. Not only does this procedure leave intact the high concentration of nitrogen (as ammonia) in the solution, but it also adds sulfur and certain metals to the solution in a form readily available to plant life. The solutions resulting from this procedure can be stored and handled in the same equipment currently used for relatively weak ammonia solutions, i.e. 24%, without any modifications. Also, since these new solutions contain about twice the amount of nitrogen as an equal volume of the conventional liquid ammonia fertilizers, only one-half as much liquid need be handled to get the same fertilizing action.

The following examples are set forth to illustrate some of the features of my invention, with the understanding that they are not limiting, but merely representative, thereof.

*Example 1*

Ten cc. of a 28% aqua ammonia solution are mixed with 40 cc. of waste pickling liquor (containing 9.8% $H_2SO_4$, 6.35% iron as Fe, and 17.27% iron as $FeSO_4$) from the steel industry, and the mixture agitated for 5 minutes. The resulting liquid has a pH of 7.9, and chemical analysis shows it to contain 3.45% nitrogen (as ammonia), 4.58% sulfur, 3.27% iron, and iron sulfates.

*Example 2*

Fourteen grams of zinc sulfate are dissolved in ten cc. of a waste pickling liquor from the galvanizing industry (similar to analysis of Example 1). This mixture is reacted with twelve cc. of 99% anhydrous ammonia. The mixture is agitated for 5 minutes during which the reaction is completed and neutralization occurs.

The resulting paste contains colloidal metallic iron, zinc tetrammine sulfates, iron ammine sulfates, ammonium sulfate, and iron ammonium sulfate. The vapor pressure of the ammonia is reduced.

In addition to zinc sulfate, salts of other metals essential to plant growth, such as potassium, copper, manganese, cobalt, and others can be added to the pickling liquor where the presence of these elements is desired in the final product.

*Example 3*

Fourteen cc. of the same waste pickling liquor of Example 1 are combined with 1 cc. of phosphoric acid (85% $H_3PO_4$). To this mixture are then added 5 cc. of a 28% aqua ammonia solution, and a thick, greenish precipitate is formed. Analysis of the paste-like product indicates that it contains 4.33% nitrogen (as ammonia), 3.80% sulfur, 3.44% iron, and 4.36% phosphorus (as $P_2O_5$), plus iron ammine sulfates, phosphates, and complexes thereof.

*Example 4*

Fifty cc. of hot waste pickling liquor with an analysis similar to that of Example 1 are added to ten g. of crushed mixed pyrites ore, and the mixture is agitated for twenty-four hours in a closed flask. The hydrogen sulfide is withdrawn and mixed with ammonia, forming ammonium sulfide.

The liquid, comprising a mixture of various metallic salts, is then decanted off from the solid residue and admixed with ammonia to form the corresponding ammines. Ammonium disulfide can be used in lieu of ammonia, or in combination with it, to form the metallic ammines. Furthermore, phosphoric acid can be added to the waste pickling liquor before leaching the pyrites ore, to provide extra phosphorus in the product.

*Example 5*

Fifty cc. of hot waste pickling liquor (as in Example 1) are combined with ten g. of mine ore tailings containing a mixture of metals, and then agitated for twenty-four hours in a closed flask. When the flask is opened, $H_2S$ is detected, indicating that the ore contained some sulfides.

The liquid is decanted off from the solid residue, and aqua ammonia is added to it. Analysis of the product shows it contains various ammine sulfides, metallic sulfates, and other metallic compounds and complexes.

*Example 6*

Ten grams of the waste ash from an incinerator used to burn up scrap wood, lumber and sawdust are neutralized by mixing it with waste pickling liquor, containing iron and sulfates, obtained from the steel industry. A liquid is produced which contains iron, potassium, copper, phosphorus, manganese, as well as various other metals in trace amounts.

This liquid can be applied directly to the soil as a fertilizer, or other fertilizer compounds and compositions, such as ammonia and ammonia compounds, can be added to it. Alternatively various salts and acids, such as nitric and phosphoric acids, can be mixed in with the pickling liquor before neutralizing the ash. Also, the pickling liquor, with or without added components, can be neutralized by a mixture of ash and ammonia, or by these separately, if desired.

Where the solutions of the ammines are colorless, an attractive blue color can be imparted to them simply by the addition of a small amount of a copper compound which is soluble in ammoniacal solutions. This serves to identify the solution, as well as to add some copper, a known plant nutrient.

The ammine solutions of my invention are ideally suited to aerial application as fertilizers, since they have an extremely low vapor pressure and are high in nitrogen, etc. concentration. The problem of loss of ammonia vapor is materially reduced, since a predominant portion of the ammonia is completely bound up in a complex, non-volatile form.

To those skilled in the art to which this invention relates, many changes in composition and widely differing embodiments and applications of the invention will suggest themselves without departing from the spirit and scope of the invention. The disclosures and the description herein are purely illustrative and are not intended to be in any sense limiting.

I claim:

1. A process of making fertilizer compositions from waste pickling liquor from the steel and galvanizing industries, comprising: combining the waste pickling liquor with a composition selected from the group consisting of anhydrous ammonia and ammonia solutions; and agitating the combination to cause all reactions to go to completion, the resulting slurry mixture being used as a fertilizer composition.

2. The process of claim 1 wherein at least one soluble salt of a metal selected from the group consisting of zinc, copper, manganese, magnesium, molybdenum, cobalt, calcium, and aluminum is added to the waste pickling liquor before it is combined with the ammonia.

3. The process of claim 1 wherein at least one acid selected from the group consisting of nitric and phosphoric acids is added to the waste pickling liquor before it is combined with the ammonia.

4. The process of claim 1 wherein the waste pickling liquor is combined with at least one soluble salt of a metal selected from the group consisting of zinc, copper, manganese, magnesium, molybdenum, cobalt, calcium, and aluminum, and with at least one acid selected from the group consisting of nitric and phosphoric acids, before it is combined with the ammonia.

5. The product resulting from the process of claim 1.

6. A process of economically utilizing waste ash resulting from burning wood and other plant matter, comprising: neutralizing a composition comprising waste ash with a composition comprising waste steel pickling liquor; and applying the liquid product directly to the soil as a fertilizer and plant growth stimulant.

7. The process of claim 6 wherein an ammonia solution is combined with the ash before it is neutralized by the waste pickling liquor.

8. The process of claim 6 wherein at least one acid selected from the group consisting of nitric and phosphoric acids is added to the waste pickling liquor before it is combined with the ash.

9. The process of claim 6 wherein the waste pickling liquor is combined with at least one soluble salt of a metal selected from the group consisting of zinc, copper, manganese, magnesium, molybdenum, cobalt, calcium, and aluminum, and with at least one acid selected from the group consisting of nitric and phosphoric acids, before it is combined with the ash.

10. The process of claim 9 wherein an ammonia solution is combined with the ash before it is neutralized by the waste pickling liquor.

11. The product resulting from the process of claim 6.

12. A process of economically utilizing waste pickling liquor from the steel and galvanizing industries, comprising: leaching a composition selected from the group consisting of mine ore tailings and pyrites fines with hot waste pickling liquor from the steel and galvanizing industries; and reacting the resultant product with a compound selected from the group consisting of ammonia, ammonium disulfide, and mixtures thereof, to form fertilizer compositions.

13. The process of claim 12 wherein phosphoric acid is added to the pickling liquor before leaching the pyrites ores.

14. The product resulting from the process of claim 12.

References Cited by the Examiner

UNITED STATES PATENTS

| | | | |
|---|---|---|---|
| 2,498,480 | 2/1950 | Bierlich | 71—23 |
| 2,574,027 | 11/1951 | Farber | 71—24 |
| 2,700,004 | 1/1955 | Miller | 134—13 |
| 2,741,876 | 4/1956 | Paoloni | 71—63 |
| 2,775,508 | 12/1956 | Thomsen | 23—61 |
| 2,798,802 | 7/1957 | Roy, et al. | 75—1 |
| 2,880,061 | 3/1959 | Muns, et al. | 23—77 |
| 2,904,425 | 9/1959 | Kippe | 71—63 |
| 2,920,950 | 1/1960 | Heise et al. | 71—63 |
| 2,927,851 | 3/1960 | Wilson | 71—62 |
| 2,929,700 | 3/1960 | Bennett | 71—25 |
| 2,939,763 | 6/1960 | Cooper | 23—61 |
| 2,970,049 | 1/1961 | Dalton | 71—63 |
| 2,983,594 | 5/1961 | Jost | 71—25 |

DONALL H. SYLVESTER, *Primary Examiner.*

ANTHONY SCIAMANNA, *Examiner.*

G. W. RUTHERFORD, *Assistant Examiner.*